Dec. 11, 1951  R. L. TICHENOR  2,578,027
STORAGE BATTERY CHARGING SYSTEM AND METHOD
Filed March 15, 1948  3 Sheets-Sheet 1

Inventor
Robert L. Tichenor
By Henry Lanahan
Attorney

Dec. 11, 1951 R. L. TICHENOR 2,578,027
STORAGE BATTERY CHARGING SYSTEM AND METHOD
Filed March 15, 1948 3 Sheets-Sheet 2
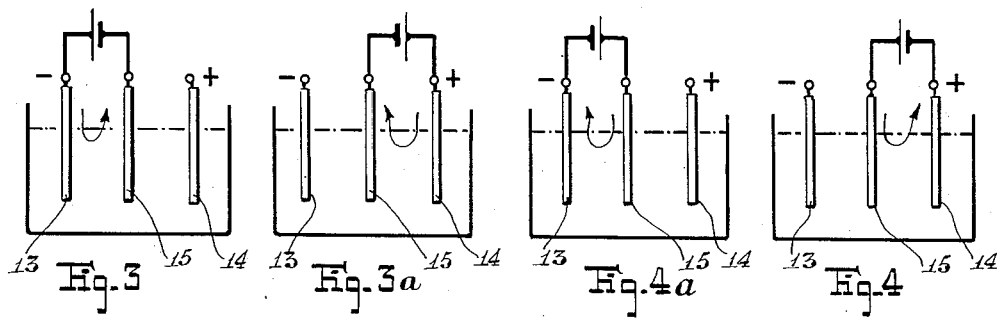
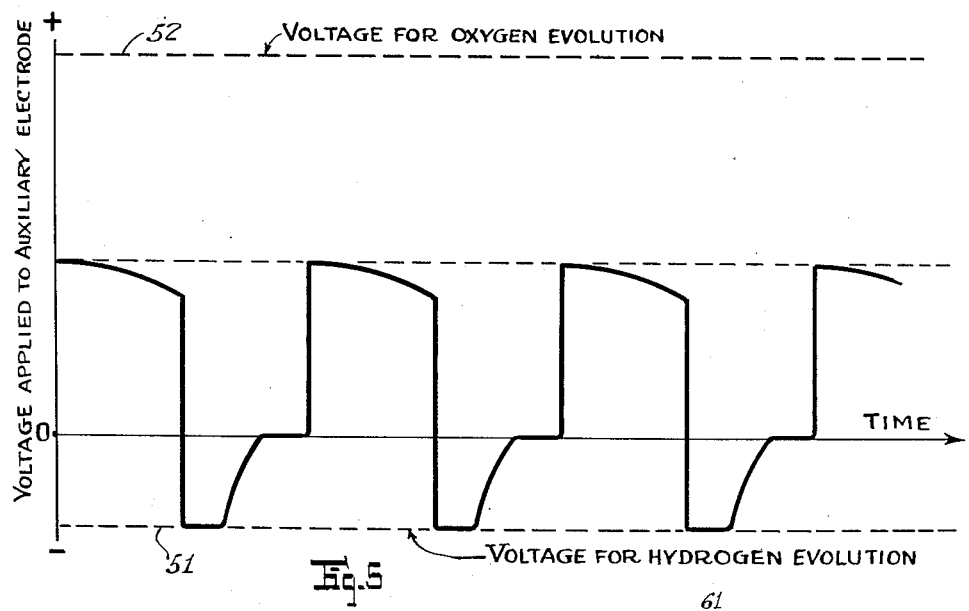
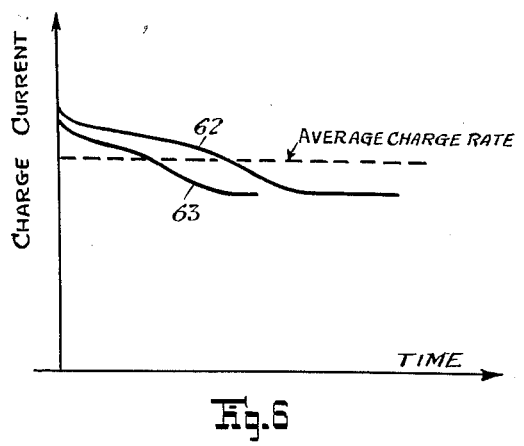
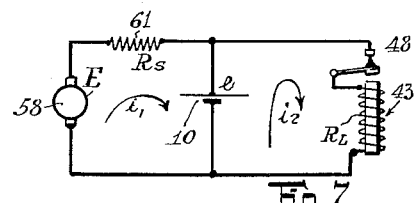
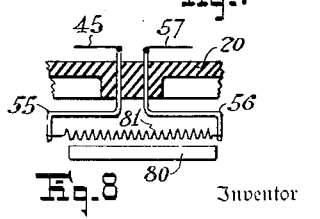
Inventor
Robert L. Tichenor
Henry Lanahan
Attorney Dec. 11, 1951    R. L. TICHENOR    2,578,027
STORAGE BATTERY CHARGING SYSTEM AND METHOD
Filed March 15, 1948    3 Sheets-Sheet 3

Inventor
Robert L. Tichenor
By Henry Lanahan
Attorney

Patented Dec. 11, 1951

2,578,027

UNITED STATES PATENT OFFICE 2,578,027

STORAGE BATTERY CHARGING SYSTEM AND METHOD

Robert L. Tichenor, East Orange, N. J., assignor to Thomas A. Edison, Incorporated, West Orange, N. J., a corporation of New Jersey Application March 15, 1948, Serial No. 14,953

33 Claims. (Cl. 320—46)

This invention relates to improvements in galvanic batteries, particularly storage batteries. In some respects, the invention relates to any battery which evolves gases that can be recombined and restored to the electrolyte, but in other respects the invention has no limitation as to the character of the electrolyte.

The present invention has as specific objects with reference, for example, to storage batteries having aqueous electrolyte solutions: (1) to control independently of each other the time average rates of charge and/or discharge of the main electrodes of a battery particularly for the purpose of maintaining the electrodes in a predetermined relative state of charge, typically in equal states of charge or, as otherwise herein expressed, in chemical balance; and (2) to cause the hydrogen and oxygen gases evolved from the electrolyte to be brought at varying intervals into substantially the stoichiometric proportions of these gases in water. By realizing these objectives, and by providing suitable means for combusting the gases, I am enabled to hermetically seal the container of the battery and maintain substantially the relative charge capabilities of the electrodes in their initial state throughout any desired period during the life of the battery. It is in terms of such hermetically-sealed batteries that I do herein particularly describe my invention. Although in this particular application of my invention the initial state of relative charge capability of the electrodes is maintained as a result of causing the gases to evolve substantially in their stoichiometric ratio, it is to be understood that I may employ these features separately of one another and that I intend no unnecessary limitation of my invention in its broader aspects to hermetically-sealed batteries.

The present invention contemplates particularly to vary relatively to each other, and to equalize, the rates of charge and/or discharge of the main electrodes of a storage battery by diverting part of the current from a selected one of the main electrodes to an auxiliary electrode. Also, it contemplates (1) that this auxiliary electrode be neither electrochemically reactive with the electrolyte nor with the gas ions produced at its surface from the electrolyte, and (2) that the potential of this auxiliary electrode be controlled relative to the potentials of the main electrodes to cause hydrogen and oxygen gas to be evolved selectively so as to maintain their ratio within predetermined limits.

General objects of my invention are to provide storage batteries having longer life, greater efficiency and less maintenance requirements than have the batteries heretofore produced.

Another object is to provide practical and dependable forms of hermetically-sealed storage batteries.

Another object is to provide a battery adapted to maintain throughout its life the initial state of relative charge capability of its positive and negative electrodes.

Other objects are to provide batteries with novel third or auxiliary electrodes and to utilize such electrodes both for controlling the relative chemical state of the battery electrodes and for selectively evolving hydrogen and oxygen gases.

Another object is to provide a battery and suitable apparatus therefor which is adapted to apply potentials of such value and polarity to the auxiliary electrode as will cause the evolved hydrogen and oxygen gases to be maintained substantially in their stoichiometric proportions in water.

Another object is to control the evolution of hydrogen and/or oxygen gas in an hermetically-sealed battery by the total pressure in the battery container.

Another object is to control selectively the evolution of hydrogen and oxygen gases in an hermetically-sealed battery according to the pressure in the battery container relative to that of the outside atmosphere.

Another object is to provide an hermetically-sealed battery having initially a gas phase of one of the gases hydrogen and oxygen preferably at a pressure lower than atmospheric, to evolve the other of said gases when the pressure rises above atmospheric pressure and to combust the evolved gases automatically when the total pressure rises to a predetermined maximum value.

Another object is to provide such hermetically-sealed battery with means which tends to prevent either main electrode ever becoming fully charged.

Another object is to provide such hermetically-sealed battery which is adapted to prevent possible overcharge of a predetermined one of the electrodes.

Another object is to provide batteries with an auxiliary electrode and with an external voltage source between that electrode and one of the main electrodes to cause evolution of gas at the auxiliary electrode.

Another object is to provide an hermetically-sealed battery having initially a gas phase of one of the gases hydrogen and oxygen and which is arranged to prevent ever a changeover of that gas phase to the other of those gases.

Another object is to provide storage batteries having a gas phase always predominantly of hydrogen so as to reduce oxidation of the active material of the negative plate.

Still another object is to provide an improved hermetically-sealed batery wherein only small quantities of gas are combusted at any one time.

These and other objects and features of my invention will be apparent from the following description and the appended claims.

In the description of my invention reference is had to the accompanying drawings, of which:

Figures 3 and 3a are diagrammatic views showing the directions of current in the battery for evolution of hydrogen when the auxiliary electrode is referred to the negative and positive electrodes respectively;

Figures 4 and 4a are diagrammatic views showing the directions of current in the battery for evolution of oxygen when the auxiliary electrode is referred to the negative and positive electrodes respectively;

Figure 5 is an approximate graph of the voltage applied to the auxiliary electrode, as produced by the apparatus shown in Figure 1, when hydrogen is evolved;

Figure 6 is a graph showing the charge current vs. time characteristics of a battery charged by the taper-current method;

Figure 7 is a simplified schematic circuit diagram to illustrate certain circuit conditions in the apparatus of Figure 1;

Figure 8 is a fractional view illustrating a modification of the apparatus of Figure 1.

It is known in the art to use auxiliary electrodes in storage batteries as a reference in determining the capacity of the positive and negative electrodes (see "Storage Batteries" by Vinal, second edition) and for selectively absorbing hydrogen and oxygen gases (see U. S. Patent No. 2,104,973 to Dassler, issued January 11, 1938). It is not known however that such electrodes have been heretofore used to maintain a relative state of charge capability of the main electrodes by the process of selectively evolving hydrogen and oxygen gases from the electrolyte solution, or to evolve hydrogen and oxygen gases selectively as illustrated by the battery arrangement shown in Figure 1.

Figure 1:
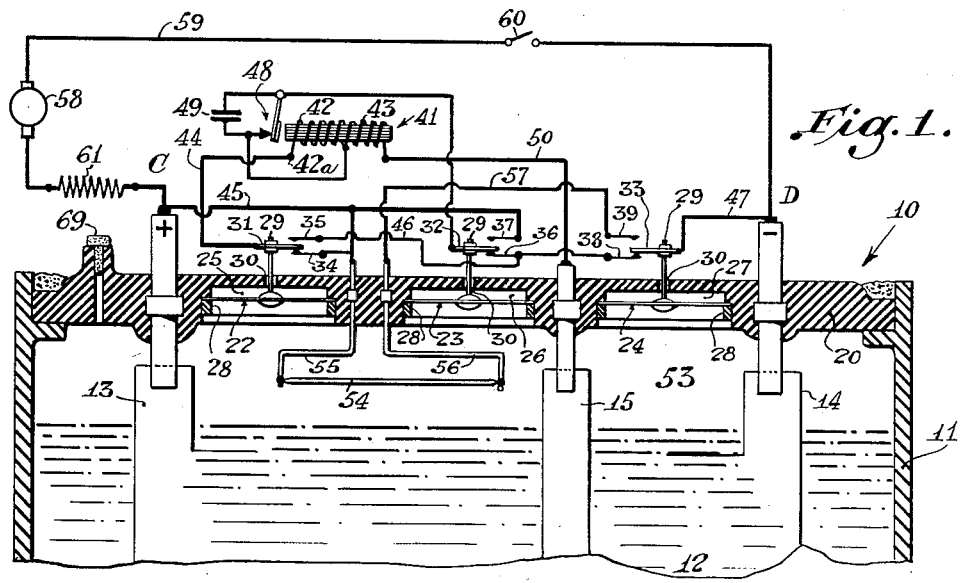
Figure 1 is a diagrammatic view of an hermetically-sealed battery with associated control circuits according to my invention.

For the present, I need describe the battery arrangement of Figure 1 only to the extent that it comprises a storage battery 10 having a container 11, an aqueous electrolyte solution 12, positive and negative electrodes 13 and 14 respectively—there being only one electrode of each polarity shown by way of example—and an auxiliary electrode 15. The auxiliary electrode may be placed in any desired location in the battery electrolyte, and may even comprise a wall of the container 11 when the container is made of metal. By way of illustration, however, it is shown as a separate electrode positioned between the two main electrodes 13 and 14.

For the purposes of the present invention the auxiliary electrode may or may not be (1) catalytic ionizing and (2) permeable. However, non-permeable electrodes are preferred because they are more economical and generally more effective. In all cases though the auxiliary electrode must be electrically conductive and must not be electrochemically reactive with the electrolyte. Although this auxiliary electrode must contact the electrolyte it need not contact the gas phase above the electrolyte. The material of the auxiliary electrode depends upon the kind of electrolyte in which it is used but there are many suitable materials for each known electrolyte. As illustrative examples, for the well-known lead-acid storage battery the auxiliary electrode may be a platinum-coated conductor, iron silicon alloys of the corrosion-resistant type, lead antimony alloys, silicon carbide, or carbon, and for the well-known nickel-iron-alkaline storage battery the auxiliary electrode may be a platinum-coated conductor, nickel, nickel alloys, nickel-plated iron, silicon carbide or carbon.

Figure 2:
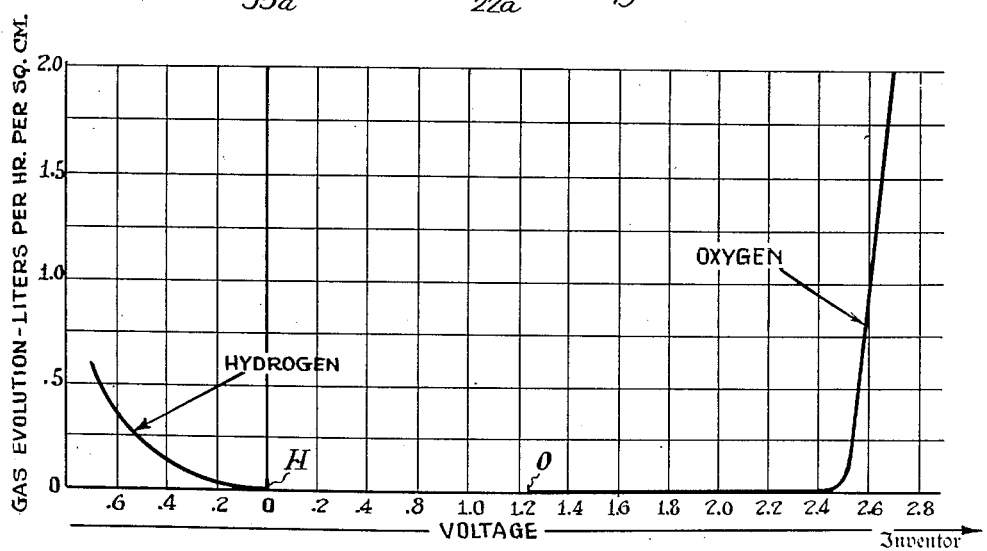
Figure 2 is a graph showing approximate curves of hydrogen and oxygen evolution vs. voltage of the auxiliary electrode.

The phenomenon of evolving gas from an aqueous electrolyte solution by an auxiliary electrode is dependent upon applying a potential to that electrode within certain definite ranges. These ranges are illustrated approximately by reference to the graph in Figure 2 in which case the auxiliary electrode is considered to be made of smooth platinum. In this graph the abscissa axis represents potential in volts and the ordinate axis represents gas evolution in liters per hour per square centimeter of area of the auxiliary electrode. The points H and O on the abscissa axis represent the potentials of hydrogen and oxygen electrodes, respectively, in an electrolyte 8N $H_2SO_4$ at 25° C., with the voltage of the hydrogen electrode being taken as a reference. The potentials of such hydrogen and oxygen electrodes are well known in the art, and since they are definite and can be predetermined (see, for example, "The Oxidation States of the Elements and Their Potentials in Aqueous Solutions" by Wendell Latimer, first edition) they are commonly used as reference potentials. For example, in a lead-acid battery having an 8 normal sulphuric acid solution the potentials of the positive and negative electrodes relative to that of a hydrogen electrode, with the gas at one atmosphere pressure, are 1.72 volts and −0.36 volt respectively.

It will be seen that as the auxiliary electrode is made negative with respect to the potential of a hydrogen electrode by increasing values known as hydrogen overvoltage the auxiliary electrode evolves hydrogen at an increasing rate, the evolution rate in all instances being proportional to the current density at the auxiliary electrode. As the auxiliary electrode is made positive with respect to the potential of an oxygen electrode by increasing values known as oxygen overvoltage there will occur a substantial oxygen evolution when the oxygen overvoltage reaches a value of approximately 1.25 volts. The use of an auxiliary electrode of a material different from smooth platinum, or of an electrolyte solution of different density and temperature than that above noted, as well as the use of an electrolyte solution of different material, say an alkaline solution, will cause the evolution curves of Figure 2 to be changed somewhat but will not change the general character of the curves.

In general, it is approximately true that the auxiliary electrode will not evolve hydrogen unless it is more negative than the negative electrode of the battery and will not evolve oxygen unless it is considerably more positive than the positive electrode of the battery. Each of these voltage conditions for evolution of gas can be realized by placing an external voltage source between the auxiliary electrode and either of the main electrodes, but different values of such external voltages will be required depending upon which main electrode is used as a reference.

The action of the auxiliary electrode in evolving hydrogen from an aqueous electrolyte solution may be described as follows: Such solutions contain both hydrogen and hydroxyl ions. When an external voltage is applied to make the auxiliary electrode negative with respect to one of the main electrodes by the necessary overvoltage for evolution of hydrogen, the hydrogen ions of the electrolyte take up electrons from the auxiliary electrode—which is now a cathode in the sense of being the electrode where the current leaves the electrolyte—to neutralize their charge and cause their evolution as hydrogen gas. If the main electrode to which this external voltage is connected is the negative electrode (Figure 3) the current causing that evolution has a discharging effect on that electrode. On the other hand if the reference electrode is the positive one (Figure 3a) the current has a charging effect on that electrode. If in the arrangement shown in Figure 3 the negative electrode is never fully discharged and in the arrangement shown in Figure 3a the positive electrode is never fully charged, the respective battery electrodes will not evolve any substantial amount of gas. Thus there is then obtained a selective evolution of hydrogen gas.

When an external voltage is applied to make the auxiliary electrode positive with respect to one of the main electrodes by the overvoltage necessary to evolve oxygen gas, the hydroxyl ions are attracted to the auxiliary electrode—now acting as an anode—and there give off their charges to evolve oxygen according to the formula $$2OH - 2E = H_2O + \tfrac{1}{2}O_2\uparrow$$

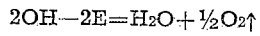

If the main electrode to which this external voltage is connected is the positive electrode (Figure 4) the current causing that evolution has a discharging effect on that electrode, but if the reference battery electrode is the negative one (Figure 4a) it has a charging effect thereon. If in the arrangement shown in Figure 4 the positive electrode is never fully discharged and in the arrangement shown in Figure 4a the negative electrode is never fully charged the respective battery electrodes will not evolve any substantial amount of gas. Accordingly there is then obtained a selective evolution of oxygen gas.

If the auxiliary electrode is made of a gas-permeable material having a catalytic ionizing action as to oxygen, this being an action however which is not required for the purposes of the present invention, it will absorb oxygen as it is made negative with respect to the oxygen electrode, assuming of course that the auxiliary electrode is in contact with the gas phase above the electrolyte. If the potential of this permeable auxiliary electrode is made sufficiently negative to reach the overvoltage required for hydrogen evolution, it will begin evolving hydrogen gas while continuing to absorb oxygen gas, and on making the potential of the auxiliary electrode somewhat more negative than that at which hydrogen evolution is first perceptible the rate of this gas evolution will be so great relative to that of the oxygen absorption that the latter has no practical significance. Similarly, if a permeable auxiliary electrode is used having a catalytic ionizing action as to hydrogen, it will absorb hydrogen as it is made positive with respect to the hydrogen electrode. If its potential is made somewhat more positive than that necessary for perceptible oxygen evolution it will evolve oxygen gas at a much greater rate than is the rate of its hydrogen absorption. Thus, I am enabled to use permeable or non-permeable auxiliary electrodes but, as aforestated, the latter are preferred.

If there is used a non-porous auxiliary electrode, or a porous ionizing auxiliary electrode not in contact with the gas phase, it will pass practically no current when it is at potentials between those of hydrogen and oxygen electrodes because it has no capability for evolving gas and substantially no capability for absorbing gas at these potentials. However, if its potential is made more negative than that of a hydrogen electrode or more positive than that of an oxygen electrode by a suitable overvoltage, a substantial current will flow through the auxiliary electrode to evolve hydrogen or oxygen gas as the case may be. A characteristic of such auxiliary electrode is that it evolves hydrogen gas only when it passes a current outwardly of the battery and oxygen gas only when it passes a current inwardly of the battery. When there is used a porous ionizing electrode in contact with the gas phase, small current will flow therein and will be accompanied by gas absorption when the potential of the auxiliary electrode is between those of the hydrogen and oxygen electrodes and a much greater current will flow therein and be accompanied by gas evolution when the potential of the auxiliary electrode is somewhat more negative than the minimum hydrogen overvoltage or somewhat more positive than the minimum oxygen overvoltage.

As hereinbefore noted with reference to Figures 3 and 3a, the current which is passed through the auxiliary electrode to evolve hydrogen may enter the battery either through the negative or positive electrodes to discharge and charge these electrodes respectively. Still differently, some of that current may enter the electrolyte through each of the main electrodes to cause one to be discharged and the other to be charged simultaneously. Likewise, the current which is passed through the auxiliary electrode to evolve oxygen (Figures 4 and 4a) may leave the battery either through the positive or negative electrodes to discharge and charge those electrodes respectively. Again, some of that current may leave the battery through each main electrode to charge one and to discharge the other simultaneously. My invention contemplates all possible such combinations for the selective evolution of oxygen and hydrogen gas and simultaneously controlling the relative states of charge of the main electrodes.

Many of the aforementioned combinations for selective evolution of hydrogen and oxygen gases and selective simultaneous control of the state of charge of the main electrodes of the battery are utilized in the battery arrangement shown in Figure 1. The battery 10 of this figure is hermetically sealed by a cover plate 20 secured fluid-tight along its edges 21 to the container 11. In order to permit the battery to be so sealed the gases which are evolved during charging, standstill and discharging are brought at varying intervals into substantially their stoichiometric proportions in water and combusted so as to prevent loss of electrolyte and to prevent the internal pressure from reaching a dangerously high value. The auxiliary electrode, together with the source of voltage and a pressure-responsive control apparatus therefor, is utilized for this purpose.

Figure 1A:
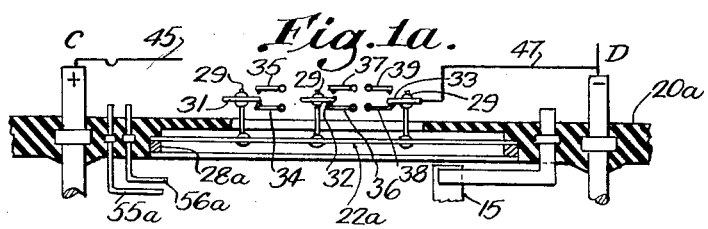
Figure 1a is a fractional view to reduced scale showing a modification of the structure of Figure 1.

The voltage-control apparatus for the auxiliary electrode comprises preferably three switches each operated by the total pressure in the battery container. All of these switches may be operated by a single diaphragm which may be a yieldable wall of the container as shown in Figure 1a and as hereinafter more particularly described; however, in Figure 1 I show three separate diaphragms 22, 23 and 24 for this purpose, these diaphragms being mounted respectively in internal wells 25, 26 and 27 provided in the cover plate 20. The diaphragms are sealed at their edges to the cover plate by respective gaskets 28. Secured in sealed relation to the central portion of each diaphragm is an upstanding rod 29 which extends through a clearance hole 30 in the cover plate and on the upper portions of these rods there are mounted respective switch pole members 31, 32 and 33. The switch pole 31 works between two semistationary contacts 34 and 35; the switch pole 32 works between two such contacts 36 and 37; and the switch pole 33 works between two such contacts 38 and 39.

The external voltage source for the auxiliary electrode has to be capable of supplying the necessary overvoltages for evolving hydrogen and oxygen gases respectively. Although these overvoltages are beyond the voltage range of the battery, they may be obtained from the battery as for example by the use of an induction coil 41.

The induction coil 41 comprises a primary winding 42 and a secondary winding 43. These windings form a transformer which, by way of illustration, is of the auto type. As shown, the primary is a part of the secondary to give a build-up of voltage across the latter. One end 42a of the primary winding, which is herein referred to as the reference end thereof, is connected by a lead 44 to the switch pole 31. The associated contact 34 is connected by a lead 45 to the positive electrode 13 and the other associated contact 35 is connected by way of a lead 46, contact 38, pole 33 and a lead 47 to the negative electrode 14. Since the switch pole 33 is normally connected to the contact 38, as will hereinafter appear, the reference end 42a for the primary winding may be connected either to the positive or negative pole of the battery, depending upon the positioning of the switch pole 31. The other end of the primary winding is connected by way of an interrupter 48 to the switch pole 32. The associated contacts 36 and 37 of this pole are connected respectively to the lead 46, to make connection with the negative electrode 14, and to the lead 45 which is connected to the positive electrode 13. By this switch means, as will hereinafter more fully appear, the primary winding may be connected across the battery with the reference end thereof connected to either main electrode. Whenever the winding is so connected across the battery, the interrupter breaks recurrently this circuit. To reduce sparking at the contacts of the interrupter a condenser 49 is connected across the interrupter.

As the primary circuit is broken by the interrupter 48, the field of the primary winding collapses and causes a voltage, of a polarity which is opposite to the voltage impressed on the induction coil when the interrupter is closed, to be induced in the secondary winding. This induced voltage is applied to the auxiliary electrode 15 by way of a lead 50, and is in reference to either the positive or the negative electrode depending upon the positioning of the switch pole 31. As a result the potential applied to the auxiliary electrode is beyond the potential range of the battery—i. e., more negative than the negative electrode or more positive than the positive electrode, depending upon the positioning of the switch pole 31. The potential which is so applied to the auxiliary electrode will however be of an alternating character with the result that an overvoltage is applied only recurrently to the auxiliary electrode to cause the latter to evolve gas intermittently. The reverse peak voltage which is applied to the auxiliary electrode between the successive periods of gas evolution should not be greater than the voltage of the battery plus whatever additional voltage is necessary to reach the overvoltage for evolution of the other of the gases than the one purposely evolved, else some of the other gas will also be evolved during each voltage cycle. For example, as shown in Figure 5, wherein the alternating voltage is referred to the negative electrode, the voltage on the auxiliary electrode will reach during the negative half cycles a value 51 to evolve hydrogen but will not reach during the positive half cycles the value 52 required to evolve oxygen.

Figure 9:
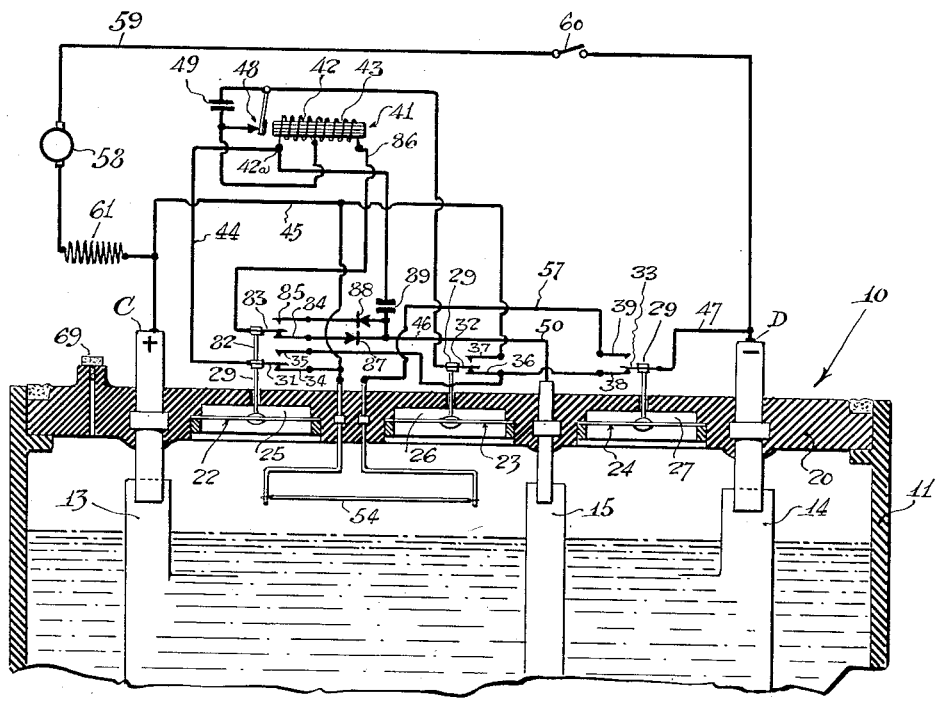
Figure 9 is a fractional view showing a modification of the apparatus of Figure 1.

Instead of applying an A. C. voltage to the auxiliary electrode, as above described, I may rectify and filter the output voltage of the induction coil 41, or provide any suitable source of D. C. voltage, so as to apply a steady D. C. voltage to the auxiliary electrode and cause it to evolve continuously hydrogen and oxygen respectively, as is needed. A means for so rectifying and filtering the output voltage of the induction coil 41 is shown in Figure 9. Herein, the left rod 29 carrying the switch pole member 31 is provided with an insulating extension 82 on the end of which is mounted a switch pole member 83. This pole member 83 works between a pair of contacts 84 and 85. When the internal battery pressure is low to cause the switch pole 31 to close with the lower contact 34, switch pole 82 closes with the lower contact 84. The high-tension end of the coil 41 is connected to the switch pole 83 by the lead 86. Contacts 84 and 85 are connected through rectifiers 87 and 88 to the lead 50 running to the auxiliary electrode 15. From the lead 50 to the reference end 42a of the coil 41 is connected a filtering condenser 89. Rectifiers 87 and 88 are connected in reverse polarity with respect to each other.

When the apparatus is in the condition shown in Figure 9, the high-tension end of the coil 41 is connected by way of the lead 86, switch pole 83, contact 84, rectifier 87 and lead 50 to the auxiliary electrode 15 to cause that electrode to evolve oxygen, the only difference from that occurring with the system shown in Figure 1 being that a substantially D.-C. potential is now applied to the auxiliary electrode to cause that electrode to evolve oxygen continuously. When the internal battery pressure rises sufficiently to close the switch poles 31 and 83 with the contacts 35 and 85 respectively and to close the switch pole 32 with the contact 37, the high-tension end of the coil 41 is connected by way of the lead 86, pole 83, contact 85, rectifier 88 and lead 50 to the auxiliary electrode 15 to apply a D.-C. potential of reverse polarity to that electrode so that it will evolve hydrogen continuously. Thus, except for the introduction of the rectifiers 87 and 88 and the filter condenser 89 to cause D.-C. instead of A.-C. potentials to be applied to the auxiliary electrode, with resultant continuous instead of intermittent evolution of gas, the system of Figure 9 functions the same as that shown in Figure 1.

The space above the electrolyte, which is herein referred to as the gas phase 53 of the battery 10, is initially filled with one of the gases hydrogen and oxygen. Purely by way of illustration, the gas with which this space is initially filled is herein considered to be oxygen. The absolute pressure of the initial gas is preferably below atmospheric, say one and one-half pounds per square inch less than atmospheric. Under this condition the pressure-responsive switches have positions as shown in Figure 1. The reference end 42a of the primary winding is now connected by way of pole 31 and contact 34 with the positive electrode, and the other end of this winding is connected by way of the interrupter 48, pole 32, contact 36, contact 38 and pole 33 to the negative electrode. Thus, the primary winding is energized recurrently to induce an A. C. voltage in the secondary winding 43. This voltage is applied to the auxiliary electrode, with the positive electrode as a reference, to cause intermittent overvoltage to be applied to the auxiliary electrode such as will produce an evolution of oxygen gas, the same gas with which the battery is initially filled.

The oxygen gas which is evolved, as described in the foregoing paragraph, will cause the internal pressure to rise relatively rapidly. When that pressure reaches a first threshold value of say minus one pound per square inch, in relation to atmospheric pressure, the diaphragm 22 moves the pole 31 from the contact 34 to the contact 35. The diaphragms 23 and 24 are however not moved sufficiently at this pressure to change the positioning of the respective switches. The primary winding is therefore now shorted by way of the lead 46 between the contacts 35 and 36 with the result that no voltage is applied at this time to the auxiliary electrode. Hydrogen and oxygen gases will however be evolved by the electrodes of the battery itself, but normally at a relatively slow rate and in varying proportions usually not in the stoichiometric ratio of these gases in water. When the internal pressure reaches a second threshold at say plus one pound per square inch relative to the atmospheric pressure, the diaphragms 23 moves the pole 32 into engagement with the contact 37. The primary winding 42 is now connected again across the battery but with its reference end 42a connected to the negative electrode. The resultant energization of this winding causes an A. C. voltage to be applied to the auxiliary electrode with the negative electrode as a reference. Consequently, the potential of the auxiliary electrode will reach recurrently the overvoltage for hydrogen evolution but will not reach the voltage required for oxygen evolution (Figure 5). The hydrogen which is so evolved will increase the internal pressure at a fast rate. When that pressure reaches a third threshold, say plus two pounds per square inch with respect to atmospheric pressure, the diaphragm 24 will move the pole 33 into engagement with the contact 39. This causes a catalyst 54 to be so activated as to cause a combustion of the evolved gases. Purely by way of example, this catalyst is shown as being of a type which must be heated in order to be effective. The heating may be carried out either directly or indirectly as desired. In the present illustrative example, the catalyst 54 is simply a wire made of or coated by a suitable catalytic material such as platinum, platinum iridium, or palladium, and is heated directly by current from the battery. This catalytic wire is held between two terminals 55 and 56. When the pole 33 engages the contact 39, as just described, the wire is connected across the battery from the negative electrode 14 by way of the lead 47, pole 33, contact 39 and a lead 57 to the terminal 56 and from the terminal 55 by way of the lead 45 to the positive electrode 13. The resultant heating of the catalyst causes it to combust all of the evolved hydrogen, which is present, with as much of the oxygen as is necessary to form water. After each combustion the internal pressure falls to a value at least lower than the second threshold as will appear, and the heater current for the catalyst wire is cut off until the pressure again builds up to the third threshold.

As shown in Figure 1a, the functions of the three diaphragms 22, 23 and 24 may be carried out by a single diaphragm 22a mounted in a central enlarged aperture provided in the cover. (The cover and the terminals 55 and 56, being herein modified to some extent, are given their prior reference characters with the suffix letter a.) This one diaphragm carries the switch blades 31, 32 and 33 which, as before, work between respective pairs of switch contacts 34—35, 36—37 and 38—39, it being understood that these contacts are so positioned relative to the respective blades that the respective switch actions occur the same as in the structure of Figure 1. There is no change in the circuit arrangement in this modification, so therefore the operation is the same as is described in connection with the apparatus of Figure 1.

The starting pressures of successive combustion cycles—i. e., the pressure occurring after each combustion—depends when the initial gas phase is oxygen upon the amount of hydrogen gas which is present when each combustion occurs. The present system is adapted never to get out of hand so long as there is a predominance of oxygen evolved at pressures below the first threshold and a predominance of hydrogen evolved at pressures above the second threshold. This will be understood by considering two extreme conditions: (1) the case where only hydrogen is evolved between the first and second thresholds, and (2) the case where only oxygen is evolved between these two thresholds. Purely by way of example, let us consider that the thresholds are respectively, as hereinbefore considered, at minus one, plus one and plus two pounds per square inch by reference to the atmospheric pressure. For the extreme condition (1) as just noted, there will be three volumes of hydrogen present when a combustion occurs—each volume being considered as that amount of gas required to produce one pound per square inch of pressure in the battery container—since only hydrogen is considered as being evolved from minus one to plus two pounds per square inch of internal pressure. These three volumes of hydrogen will combine with one and one-half volumes of oxygen to cause a reduction in pressure of four and one-half pounds per square inch from the level of the third threshold when a combustion occurs, which is a reduction to a starting pressure of minus two and one-half pounds per square inch. Since this pressure is below the first threshold oxygen will be evolved until the pressure builds up again to minus one pound per square inch whereupon the cycle of operations will eventually repeat unless conditions change and cause a different rate of evolution of oxygen and hydrogen gases. For the second extreme above noted wherein only hydrogen is evolved between the second and third thresholds, there will be only one volume of hydrogen present when a combustion occurs. This one volume of hydrogen will combine with one-half volume of oxygen to cause the pressure to fall to a starting value of plus one-half pound per square inch when a combustion occurs. Again unless conditions change, oxygen will evolve until the pressure reaches one pound per square inch whereupon the cycle of operations will repeat. Thus, so long as there is evolved a predominance of oxygen at pressures below minus one pound per square inch and a predominance of hydrogen at pressures above one pound per square inch the maximum possible range of internal pressure will be from minus two and one-half to plus two pounds per square inch, and the maximum possible range of starting pressures of successive combustion cycles will be from minus two and one-half to plus one-half pounds per square inch. Of course, these specific values are for the particular threshold pressures above noted, but it will be understood that these threshold pressures may be varied so long as their sequence is not changed.

In order to understand the conditions under which it will be assured that there will be evolved a predominance of oxygen below the first threshold and a predominance of hydrogen above the second threshold, it is to be remembered that the battery electrodes evolve relatively little gas so long as they are not in an overcharged condition. By referring the auxiliary electrode to the positive electrode when oxygen is evolved and to the negative electrode when hydrogen is evolved, the reference electrode tends never to be overcharged and tends therefore to evolve comparatively little gas. The battery electrode, if any, which may tend to be overcharged is the non-reference one as with respect to the auxiliary electrode. But even if current is passed through the non-reference electrode while it is in an overcharged condition, the auxiliary electrode may still evolve an amount of oxygen or hydrogen, as the case may be, which is greater than the stoichiometric equivalent of the other gas evolved by the overcharged battery electrode provided the current through the auxiliary electrode is greater than that through the overcharged battery electrode. The voltage source for the auxiliary electrode may be adapted to provide such greater current. However, I prefer to assure that the auxiliary electrode will evolve the needed excess of one or the other of the gases, as desired, by never permitting overcharge of the non-reference electrode while the auxiliary electrode is evolving gas.

Typically, batteries are charge by the taper-current method—which is to charge them from a fixed voltage source through a fixed series resistor. For example, in Figure 1, the battery 10 may be charged by a direct-current generator 58 through a charge line 59 serially including a manual switch 60 and series resistor 61. By this charging method the charge rate starts high and tapers off asymptotically as the battery becomes charged (Figure 6). If the battery is initially fully discharged the charging current-time characteristic is typically as shown by the curve 62 and if the battery is initially about half discharged this characteristic is typically shown by the curve 63, it being noted that the charging current starts and falls from and to the same values. When the values of the generator voltage and the series resistor are properly chosen for any one type of battery, the charging current never exceeds a safe value regardless of the initial state of charge of the battery. However, with continued charging of the battery, it may be overcharged.

In the present illustrative example wherein the current for the auxiliary electrode is obtained from a circuit connected in shunt across the battery, it can be readily shown that that shunt circuit—to wit, the induction coil 43—may be utilized to prevent the non-reference electrode from evolving gas while the auxiliary electrode is evolving gas provided the battery is charged by the taper-current method. This may be understood by reference, for example, to the simplified circuit of Figure 7 wherein the voltage of the generator 58 is represented as E, the voltage of the battery 10 as $e$, the resistance of the series resistor 61 as $R_s$ and the effective load resistance of the induction coil 43 as $R_L$. The current $I_1$ in the first mesh of the circuit will flow continuously and will be equal to $$\frac{E-e}{R_s}$$

upon the approximation that the battery 10 has negligible internal resistance. The discharge current due to the shunting effect on the induction coil 43 is simply $$\frac{e}{R_L}$$

However this current flows only half of the time because of the interrupter 48 and has therefore the approximate effective value $$\frac{e}{2R_L}$$

or the condition where the state of charge of the battery is stabilized, $$\frac{E-e}{R_s}=\frac{e}{2R_L}$$

or $$e=\frac{2R_L}{R_s+2R_L}E$$

Thus, the resistors $R_s$ and $R_L$, and the voltage E, predetermine a voltage $e$ for the battery above which it cannot be charged so long as the induction coil is shunted across the battery. Overcharge of the battery during gas evolution of the auxiliary electrode is thus prevented to assure that the axuiliary electrode will cause oxygen and hydrogen respectively to be evolved in excess of the stoichiometric equivalent of the other gas at pressures below and above the first and second thresholds. In fact, when the condition is met where the charge of the non-reference electrode is stabilized while the auxiliary electrode is evolving gas, the effective current through the non-reference electrode is nearly zero and the gas evolved by this electrode is necessarily very small. At the same time the effective current through the reference electrode tends to discharge that electrode because of the current of the auxiliary electrode.

It has been shown, as with reference to Figures 3 and 4, that while the battery is being charged the negative electrode is charged at a lesser rate as hydrogen is evolved by the auxiliary electrode and the positive electrode is charged at a lesser rate as oxygen is evolved by the auxiliary electrode. In each case the amount of gas which is so evolved is proportional to the difference in charge rates for the two electrodes. Since in the present hermetically-sealed battery the evolved hydrogen and oxygen gases are on the average maintained in their stoichiometric proportions in water, it follows that in such a sealed battery the electrodes will be held closely to their initial state of relative charge capability, it being understood that the charge capability of an electrode depends both on its electrochemical capacity and state of charge. If the positive and negative electrodes of the battery have equal charge capabilities when the battery is sealed—i. e., each electrode requires the passage therethrough of the same ampere hours to reach a state of full charge—then by a proper setting of the circuit constants the battery electrode will be prevented from ever being overcharged. If prevention of a complete discharge of a predetermined one of the electrodes is to be assured by a wide margin, that electrode is provided with a greater electrochemical capacity than is the other and is also initially partially charged when the battery is sealed, it being assumed that the other electrode is initially not charged. On the other hand, if prevention of overcharge of a predetermined one of the electrodes is to be assured by a wide margin, then that electrode is provided again with a greater electrochemical capacity than is the other but is initially not charged when the battery is sealed, it being again assumed that the other electrode is initially not charged. Of course, this other electrode may be initially partially or fully charged so long as the desired differential in the charge capabilities of the electrodes is obtained when the battery is sealed. The feature of being able to prevent possible complete discharge of a predetermined one of the electrodes is important particularly in connection with the nickel-iron-alkaline battery, and the feature of being able to prevent possible overcharge of a predetermined one of the electrode is very important in connection with the lead-acid battery since overcharge of the positive electrode of that battery is very harmful.

In place of using a catalyst 54 that is rendered intermittently effective, as above described, I may use a continuously-effective catalyst represented diagrammatically as 80 in Figure 8. Catalysts which are continuously effective at unheated temperatures—i. e., room temperatures and less— are now known. Such a catalyst may consist, for example, of 1.4% platinum metal and .2% rhodium metal dispersed on and in porous aluminum oxide. If oxygen should continue to evolve in excess so that the pressure should rise above the second threshold then hydrogen will be evolved by the auxiliary electrode as above described. That evolved hydrogen will be combusted though by the catalyst so that the pressure will hover about the second threshold. Therefore, so long as the catalyst is operative, the pressure will not end to rise substantially above the second threshold.

If the catalyst should lose its activity for any reason, and being of a character that is reactivated when heated, there may be placed a heater 81 in juxtaposition with the catalyst, which may be connected to the terminals 55 and 56 as shown in Figure 8 so that the heater is energized whenever the internal pressure reaches the third threshold above described. The operation of the system in this event would be the same as with the catalyst 54 hereinbefore described.

It is to be noted that since the gas phase of the battery is initially one of the gases hydrogen and oxygen at a given initial pressure, and since the other gas is evolved by the auxiliary electrode through a pressure range which is only a fraction of the initial pressure, it follows that there cannot possibly ever occur a changeover of the gas phase from one gas to the other. This is true regardless of which of the gases oxygen and hydrogen is initially placed in the gas phase 53 of the battery. For instance, instead of starting with oxygen as described, I may start with hydrogen and cause then more hydrogen to be evolved at pressures below the first threshold and oxygen to be evolved purposely at pressures above the second threshold to obtain the same sequence of operations. In some cases, as with the nickel-iron-alkaline battery, it is desirable that the initial gas phase be hydrogen for then any tendency of oxidation of the negative plate is greatly mitigated.

As a precautionary means, the battery container 11 is provided with a safety blow-out plug 69 to prevent possible build-up of the internal pressure to a dangerously high value in the event that some part of the system may become inoperative.

The present invention has been herein particularly described both in terms of its broader aspects and in terms of particular practical applications thereof. No unnecessary limitation of the broader aspects of the invention to the particular applications is intended since it will be apparent to those skilled in the art that the invention has varied practical uses. The scope of my invention I endeavor to express according to the following claims.

I claim:

1. The method of maintaining substantially the electrodes of opposite polarity of a battery in a predetermined state of relative charge as current is passed therebetween during use of the battery, which comprises passing additional currents between an auxiliary electrode of said battery and said electrodes selectively.

2. The method of maintaining substantially the electrodes of opposite polarity of a storage battery in an approximate condition of chemical balance, which comprises passing a charging current between said electrodes and further passing a current between a selected one of said electrodes and an auxiliary electrode to balance the state of charge of said one electrode with that of the other.

3. The method of maintaining substantially the electrodes of opposite polarity of a storage battery in an approximate condition of chemical balance, which comprises passing a charging current between said electrodes and further passing a charging current between that one of said electrodes having the lesser state of charge and an auxiliary electrode of the battery.

4. The method of maintaining substantially the electrodes of opposite polarity of a storage battery in an approximate condition of chemical balance, which comprises passing a discharging current between said electrodes and futher passing a current between a selected one of said electrodes and an auxiliary electrode to balance the state of charge of said one electrode with that of the other.

5. The method of maintaining substantially the electrodes of opposite polarity in a battery in an approximate condition of chemical balance, which comprises passing a discharging current between said electrodes and further passing a discharging current between that one of said electrodes having the greater state of charge and an auxiliary electrode of the battery.

6. The method of evolving gas from a storage battery having an electrolyte solution and simultaneously varying the relative state of charge of the main electrodes of a battery, which comprises passing a current between one of said main electrodes and a non-permeable auxiliary electrode in contact with said electrolyte and of a material electrochemically non-reactive therewith.

7. The method of evolving gas from a storage battery having an aqueous electrolyte solution and simultaneously varying the relative state of charge of the main electrodes of a battery, which comprises applying a voltage between one of said main electrodes and an auxiliary electrode contacting said electrolyte and chemically non-reactive therewith, which voltage is sufficient to place the potential of the auxiliary electrode at a value in excess of the overvoltage for evolution of a selected one of the gases hydrogen and oxygen.

8. The method of selectively evolving oxygen and hydrogen gases during operation of a battery having an aqueous electrolyte solution and positive and negative main electrodes contacting said solution, which comprises passing current respectively into and out of said electrolyte by way of a non-permeable auxiliary electrode also contacting said electrolyte solution, said auxiliary electrode being electrochemically non-reactive with said solution.

9. The method of selectively evolving oxygen and hydrogen gases during operation of a storage battery having an aqueous electrolyte solution and positive and negative main electrodes, which comprises connecting an external voltage between an auxiliary electrode, which contacts said electrolyte solution and is chemically non-reactive therewith, and said main electrodes selectively to place the potential of said auxiliary electrode at values in excess of the overvoltages for evolution of oxygen and hydrogen respectively.

10. The method of selectively evolving oxygen and hydrogen gases during operation of a battery having an aqueous electrolyte solution and positive and negative main electrodes, which comprises selectively connecting an external voltage source between an auxiliary electrode, which contacts said electrolyte solution and is chemically non-reactive therewith, and said positive and negative main electrodes respectively, with said voltage source being polarized to render said auxiliary electrode positive with respect to the positive electrode of the battery when said potential source is connected to said positive electrode and to render the auxiliary electrode negative with respect to the negative electrode of the battery when the potential source is connected to said negative electrode.

11. The method of selectively evolving oxygen and hydrogen gases during operation of a storage battery having an aqueous electrolyte solution and positive and negative main electrodes, which comprises deriving a voltage from said battery and selectively utilizing said voltage to place the potential of an auxiliary electrode, which contacts said electrolyte solution and is electrochemically non-reactive therewith, at respective voltages more positive than is the potential of the positive electrode of the battery and more negative than is the potential of the negative electrode of the battery.

12. A battery comprising an aqueous electrolyte solution, positive and negative main electrodes in said electrolyte solution, an auxiliary electrode contacting said electrolyte solution and of a material electrochemically non-reactive with said solution, and means controlled to pass current between said auxiliary electrode and said main electrodes selectively, by way of said electrolyte solution, for varying intermittently the degree of charge of said main electrodes with respect to each other.

13. A storage battery having an aqueous electrolyte solution and adapted to maintain the charge capability of its electrodes substantially in fixed relation to each other throughout the life of the battery, comprising an hermetically-sealed container for the battery, means differently responsive to different internal pressures in said container for causing the hydrogen and oxygen gases evolved from the battery to be brought at varying intervals into approximately their stoichiometric proportions in water, and means for combusting said gases.

14. In a battery comprising an electrolyte solution, and positive and negative electrodes contacting said solution: the combination of an auxiliary electrode contacting said solution and of a material electrochemically non-reactive with said solution; a voltage source; and means for connecting said source between said auxiliary electrode and one of said main electrodes to place the potential of the auxiliary electrode beyond the voltage range of said battery.

15. In a battery comprising an electrolyte solution, and positive and negative electrodes contacting said solution: the combination of an auxiliary electrode contacting said solution and of a material electrochemically non-reactive with said solution; a voltage source; and switch means operable for selectively connecting said voltage source between said auxiliary electrode and said main electrodes respectively.

16. In a storage battery comprising an aqueous electrolyte solution, and positive and negative electrodes contacting said solution: the combination of an auxiliary electrode contacting said solution and of a material electrochemically non-reactive therewith; means for applying a voltage to said main electrodes to charge the battery; and means connected between one of said main electrodes and said auxiliary electrode to place the potential of the latter at a value equal at least to the overvoltage for the evolution of a predetermined one of the gases hydrogen and oxygen.

17. In a storage battery comprising an aqueous electrolyte solution, and positive and negative electrodes contacting said solution: the combination of a non-permeable auxiliary electrode contacting said solution and of a material electrochemically non-reactive therewith; means for applying a voltage to said battery electrodes to charge the same; and means connected between one of said main electrodes and said auxiliary electrode to apply a voltage to the latter sufficient to cause the auxiliary electrode to pass current and evolve gas.

18. A storage battery comprising an aqueous electrolyte solution, positive and negative main electrodes contacting said solution, an auxiliary electrode contacting said solution and adapted to evolve hydrogen gas from said solution at a substantial rate when the auxiliary electrode is at a potential more negative than that of the negative electrode of the battery and to evolve oxygen gas from said solution at a substantial rate when the auxiliary electrode is at a prescribed potential more positive than that of the positive electrode of the battery, means connected between said negative electrode and said auxiliary electrode for rendering the latter negative with respect to the former to cause evolution of hydrogen gas, and means for connecting said last-stated means between said positive electrode and said auxiliary electrode for rendering the latter positive with respect to the former to cause evolution of oxygen gas.

19. A storage battery comprising an aqueous electrolyte solution, positive and negative main electrodes contacting said solution, a gas-impermeable auxiliary electrode contacting said solution, said auxiliary electrode being of a material electrochemically non-reactive with said solution and adapted to cause evolution of oxygen gas as current is passed from the auxiliary electrode to one of the main electrodes of the battery by way of said solution and to evolve hydrogen gas as current is passed from one of said main electrodes of the battery to said auxiliary electrode by way of said solution, an hermetically-sealed container for said battery initially containing therein predominantly one of the gases hydrogen and oxygen, and means responsive to the total pressure in said container for passing current into and out of said electrolyte solution by way of said auxiliary electrode to evolve oxygen and hydrogen selectively in predetermined relation to the value of said total pressure relative to that of the atmosphere.

20. In a battery having an aqueous electrolyte solution: the combination of an hermetically-sealed container for said battery having therein a gas phase initially comprising predominantly one of the gases hydrogen and oxygen; means responsive to the total pressure in said container for evolving the other of said gases when the pressure rises to a given threshold; and means for combusting said gases.

21. In a battery having an aqueous electrolyte solution: the combination of an hermetically-sealed container for said battery having therein a gas phase initially comrising predominantly one of the gases hydrogen and oxygen; and means, responsive to a total pressure in said container which is higher than said threshold by a margin less than the value of the initial pressure in said container, for combusting said gases.

22. The combination set forth in claim 20 wherein said initial pressure in said container is less than that of the outside atmosphere, and said threshold at which the other of said gases is evolved is greater than the pressure of the outside atmosphere.

23. In a battery having an aqueous electrolyte solution: the combination of an hermetically-sealed container for said battery having therein a gas phase initially comprising predominantly one of the gases hydrogen and oxygen; means operative when the total pressure in said container is below a first threshold for evolving said one gas; means rendered operative by said pressure when the same rises to a value above a second threshold higher than said first threshold for evolving the other of said gases; and means for combusting said gases.

24. The combination set forth in claim 23 wherein said first and second thresholds are respectively below and above atmospheric pressure.

25. The combination set forth in claim 23 wherein said combusting means is in a normally ineffective condition, including means responsive to a total pressure in said container which is above said second threshold and less than the pressure which would be produced in said container were said other gas present in stoichiometric proportion with the initial quantity of said one gas, for rendering said combusting means effective.

26. In a battery having an aqueous electrolyte solution and positive and negative main electrodes contacting said solution: the combination of an hermetically-sealed container for said battery having therein a gas phase initially comprising predominantly one of the gases hydrogen and oxygen; an auxiliary electrode contacting said solution and electrochemically non-reactive therewith; pressure-responsive means for connecting a source of potential between said auxiliary electrode and one of said main electrodes to cause evolution of said one gas when the total pressure in said container is less than a first threshold, and for connecting said source between said auxiliary electrode and the other of said main electrodes to cause evolution of the other of said gases when said total pressure is above a second threshold higher than said first threshold; a catalyst member in said container for combusting said gases, said catalyst member being normally ineffective and being rendered effective when heated; and pressure-responsive means in said container for rendering said catalyst member effective when said total pressure reaches a third threshold higher than said second threshold.

27. In a storage battery having an aqueous electrolyte solution and main electrodes of opposite polarity contacting said solution: the combination of an hermetically-sealed container for said battery having therein a gas phase initially comprising predominantly one of said gases hydrogen and oxygen; means controlled by the total pressure in said container to evolve the other of said gases when said total pressure exceeds a given threshold; a charging circuit connected to said battery for charging the battery by the taper-current method; a load circuit adapted when connected across said battery, while the battery is connected to said charging circuit, for limiting the charge of the battery electrodes; means responsive automatically to the pressure in the battery container as the pressure rises above a given value at least equal to said threshold for connecting said load circuit across said battery; and means for combusting said gases.

28. In combination with a storage battery: a charging circuit connected to said battery for charging the battery by the taper-current method; a load circuit for the battery adapted when connected across the battery, while the battery is connected to said charging circuit, to limit the charge of the battery to a predetermined value; and means automatically controlled by the pressure in the battery and according to the state of charge of the battery for causing said load circuit to be connected intermittently across the battery for lesser percentage time durations when said battery is in at least a partially discharged condition and greater percentage time durations when said battery becomes nearly fully charged.

29. In a storage battery having an aqueous electrolyte solution and main electrodes of opposite polarity contacting said solution: the combination of an hermetically-sealed container for said battery having therein a gas phase initially comprising predominantly one of the gases hydrogen and oxygen; an auxiliary electrode contacting said solution and electrochemically non-reactive therewith; means connected to said battery for charging the same; means responsive to the pressure in said container at pressures below a first threshold for evolving said one gas and causing simultaneously one of said electrodes to be charged at a greater rate than the other; means responsive to said pressure when the pressure exceeds a second threshold greater than said first threshold for evolving the other of said gases and causing simultaneously the other of said electrodes to be charged at a greater rate than said one electrode; and means for combusting said gases.

30. The combination set forth in claim 29 including means shunting said battery at pressures both below said first threshold and above said second threshold to prevent overcharge of the battery electrodes by said charging means while said gas-evolving means is in operation.

31. In combination: an hermetically-sealed battery comprising an aqueous electrolyte solution and main electrodes of opposite polarity contacting said solution, said battery having initially a gas phase predominantly of one of the gases oxygen and hydrogen; an auxiliary electrode in said solution adapted to evolve hydrogen when the potential thereof is more negative than the negative electrodes of the battery and to evolve oxygen when the potential thereof is positive by the prescribed amount with respect to the positive electrode of the battery; means connected to the battery for charging the same; a voltage source; means responsive to the pressure in said container when the pressure is below a first threshold for connecting said source between said auxiliary electrode and one of said main electrodes as a reference to cause evolution of said one gas and to cause simultaneously said one electrode to be charged at a lesser rate than that of the other; means responsive to the pressure in said container when that pressure is above a second threshold higher than said first threshold for connecting said source between said auxiliary electrode and the other of said main electrodes as a reference to cause evolution of the other of the said gases and simultaneously cause said other electrode to be charged at a lesser rate; means for combusting said gases; and means controlled by the pressure in the battery to limit the charge of the non-reference one of the battery electrodes while said auxiliary electrode is connected to said voltage source to evolve gas.

32. In combination: an hermetically-sealed battery comprising an aqueous electrolyte solution and main electrodes in said solution of opposite polarity, said battery initially having a gas phase predominantly of one of the gases hydrogen and oxygen; an auxiliary electrode in said solution for evolving said gases selectively; a circuit connected to said battery for charging the same by the taper-current method; and means controlled by the gas pressure in said battery to pass a current between said auxiliary electrode and one of the battery electrodes to evolve said one gas and produce a discharging effect on said one electrode while said pressure is below a first threshold, and to pass current between said auxiliary electrode and the other of the battery electrodes to evolve the other of said gases and produce a discharging effect on said other electrode while the pressure is above a second threshold higher than said first threshold, said last-stated means being further adapted to place a load across said battery, while said auxiliary electrode is evolving gas, to limit the charging rate of said other electrode when said one gas is evolved and of said one electrode when said other gas is evolved whereby to assure that the auxiliary electrode will evolve an excess of said one gas at pressures below said first threshold and an excess of said other gas at pressures above said second threshold.

33. In combination, a storage battery having main electrodes one of which has a lesser charge capability than the other and the other of which is subject to damage when overcharged, means for passing charging current between said main electrodes, and means responsive to overcharge of said one electrode for diverting part of said charging current, on the average, from said other electrode whereby to safeguard said other electrode from being overcharged.

ROBERT L. TICHENOR.

REFERENCES CITED

The following references are of record in the file of this patent:

UNITED STATES PATENTS

| Number | Name | Date |
| --- | --- | --- |
| 1,034,108 | Halbleib | July 30, 1912 |
| 1,172,886 | Halter | Feb. 22, 1916 |
| 1,324,797 | Chubb | Dec. 16, 1919 |
| 1,442,868 | Ernest | Jan. 23, 1923 |
| 1,557,602 | Monnot | Oct. 20, 1925 |
| 1,605,020 | Woodbridge | Nov. 2, 1926 |
| 1,694,530 | Davis | Dec. 11, 1928 |
| 1,733,334 | Davis | Oct. 29, 1929 |
| 1,916,235 | Ruben | July 4, 1933 |
| 1,983,243 | Rose et al. | Dec. 4, 1934 |
| 2,051,039 | Guthrie | Aug. 18, 1936 |
| 2,104,973 | Dassler | Jan. 11, 1938 |